United States Patent
Kalliola et al.

(10) Patent No.: US 7,995,519 B2
(45) Date of Patent: Aug. 9, 2011

(54) CENTRALISED MANAGEMENT FOR A SET OF NETWORK NODES

(75) Inventors: Janne Kalliola, Espoo (FI); Thomas Dahlblom, Espoo (FI); Markus Aalto, Vantaa (FI); Tommi Lattu, Madrid (ES); Mikko Tiihonen, Helsinki (FI); MengHong Wong, Singapore (SG)

(73) Assignee: Airwide Solutions Oy, Espoo (FI)

( * ) Notice: Subject to any disclaimer, the term of this patent is extended or adjusted under 35 U.S.C. 154(b) by 738 days.

(21) Appl. No.: 11/885,311

(22) PCT Filed: Mar. 21, 2006

(86) PCT No.: PCT/FI2006/050107
§ 371 (c)(1),
(2), (4) Date: May 12, 2008

(87) PCT Pub. No.: WO2006/100349
PCT Pub. Date: Sep. 28, 2006

(65) Prior Publication Data
US 2009/0098861 A1    Apr. 16, 2009

(30) Foreign Application Priority Data
Mar. 23, 2005 (FI) .................................... 20055130

(51) Int. Cl.
*H04W 4/00* (2009.01)
(52) U.S. Cl. ...................................................... 370/328
(58) Field of Classification Search .................. 455/408, 455/418, 419; 9/408, 418, 419; 370/328
See application file for complete search history.

(56) References Cited

U.S. PATENT DOCUMENTS

| | | | | |
|---|---|---|---|---|
| 6,339,705 | B1 * | 1/2002 | Pehrson | 455/419 |
| 6,931,558 | B1 * | 8/2005 | Jeffe et al. | 713/340 |
| 6,970,917 | B1 * | 11/2005 | Kushwaha et al. | 709/217 |
| 6,990,518 | B1 | 1/2006 | Secer | 709/223 |
| 7,319,684 | B2 * | 1/2008 | Tamaki et al. | 370/337 |
| 7,583,960 | B2 * | 9/2009 | Wierman et al. | 455/418 |
| 7,604,162 | B2 * | 10/2009 | Li et al. | 235/376 |
| 7,701,898 | B2 * | 4/2010 | Owen | 370/328 |
| 7,702,310 | B1 * | 4/2010 | Parks et al. | 455/405 |

(Continued)

FOREIGN PATENT DOCUMENTS
EP    1 615 383 A1    1/2006

(Continued)

OTHER PUBLICATIONS

Feldkun, L., et al., "Towards an Integrated Management System for Heterogeneous Network Environments", © 1988 IEEE pp. 867-876.

(Continued)

*Primary Examiner* — Lester Kincaid
*Assistant Examiner* — Nathan Mitchell
(74) *Attorney, Agent, or Firm* — Shalom Wertsberger; Saltamar Innovations

(57) ABSTRACT

The invention relates to a method for centralised management of a set of network nodes. The method includes supporting, in a centralised management entity, operations of at least one predefined management interface, wherein said predefined management interface is specific to said centralised management entity, implementing, at least partially, at least one of said predefined management interfaces in the network nodes of said set, and controlling, via said centralised management entity, a network node of said set by means of a management interface implementation relating to said node.

26 Claims, 7 Drawing Sheets

U.S. PATENT DOCUMENTS

| | | | |
|---|---|---|---|
| 7,734,737 B2 * | 6/2010 | Mittal et al. | 709/220 |
| 7,742,756 B2 * | 6/2010 | Natsuno et al. | 455/412.1 |
| 2001/0016880 A1 | 8/2001 | Cai et al. | 709/321 |
| 2002/0025806 A1 * | 2/2002 | Gerber | 455/422 |
| 2002/0124046 A1 * | 9/2002 | Fischer et al. | 709/201 |
| 2003/0005034 A1 | 1/2003 | Amin | 709/202 |
| 2003/0064720 A1 * | 4/2003 | Valins et al. | 455/423 |
| 2003/0139174 A1 * | 7/2003 | Rao | 455/418 |
| 2003/0162537 A1 | 8/2003 | Hirsch | 455/423 |
| 2003/0236103 A1 * | 12/2003 | Tamaki et al. | 455/552.1 |
| 2004/0003078 A1 | 1/2004 | Todd et al. | 709/224 |
| 2005/0090263 A1 * | 4/2005 | Ebata | 455/453 |
| 2005/0233735 A1 * | 10/2005 | Karaoguz et al. | 455/415 |
| 2005/0272455 A1 * | 12/2005 | Oommen | 455/518 |

FOREIGN PATENT DOCUMENTS

| | | |
|---|---|---|
| WO | WO 2004/091144 A1 | 10/2004 |

OTHER PUBLICATIONS

Agoulmine, N., et al., "A System Architecture for Updating Management Information in Heterogeneous Networks", © 1992 IEEE, pp. 999-1003.

* cited by examiner

CENTRALISED MANAGEMENT FOR A SET OF NETWORK NODES

FIELD OF THE INVENTION

The invention relates to management of service delivery platforms or some other sets of network nodes in mobile networks.

BACKGROUND OF THE INVENTION

In mobile networks different types of mobile services are provided for the users of mobile terminals connected to the mobile networks through different types of gateway elements. Both the operators themselves and external service providers provide the services.

Operators have several gateway elements and other systems for delivering and managing different types of value added service traffic (for example SMS, MMS, WAP, HTTP, e-mail and so forth). In order to better manage the various services, the operators are currently consolidating their mobile value added services into one Service Delivery Platform (SDP). The platform comprises all required functionality for connectivity, transaction management, service management, billing, logging and so forth and consists of several systems performing specific functions. External service providers obtain access to mobile terminals by connecting to such SDPs.

Service Delivery Platform concept is not yet fully established and defined—different market players understand it differently. SDP may mean all or some of the following:
- A system and processes for cost-effective and speedy creation, deployment, provisioning, execution, management and billing of a set of services.
- In addition to the above, also an infrastructure that delivers packet-based voice and data centric advanced services in a device agnostic and network agnostic manner.
- A set of platforms that aggregate different network capabilities and services, and content sources, and thus allow application developers a simplified, uniform/standard way to access such capabilities, services and content.
- An infrastructure that inter-works well with IT infrastructure (BSS, Business Support System) such as a billing system, CRM (Customer Relationship Management), AAA (Access, Authorization and Accounting), OSS (Operations Support System) infrastructure such as provisioning. Network elements such as switches, SMSC, MMSC, and WAP Gateways.

Currently, the service delivery platforms are built by the operator or a system integrator from products, which may be from different vendors. Every component or node of the platform may be from a different vendor or, alternatively, the platform may be provided by a single vendor. Nevertheless, even if the whole platform is from a single vendor, some of the nodes may be out-sourced, subcontracted or purchased from some other vendor. Because different nodes are from different sources, there is no common management concept available for the platform. That is, every node has its own management interface and every node produces its own statistics.

For this reason, in many implementations every node of an SDP needs to be managed separately. That is, every node provides its own interface and administrators of the SDPs use only these interfaces. This is clearly burdensome, since administrators need to learn to use various different interfaces: they need to be aware of several different management concepts, know how to use different user interfaces and understand different statistics. Therefore, a lot of documentation and practice is needed. Furthermore, such separated management is error prone and integration to separate management systems is time consuming and expensive.

An example of an implementation with separate management for each SDP node is shown in FIG. 1. The system comprises two SDP nodes 101 and 102 in an operator network. The SDP nodes may be for example an MMS gateway and a WAP gateway. Service providers 104 and 105 are respectfully connected to the SDP nodes 101 and 102 over Internet. By means of the functionality provided by the SDP nodes these service providers provide services to mobile subscribers 106 and 107, which are connected to the SDP nodes via mobile network. Herein it must be noted that the SDP nodes need not be physically separate devices. Alternatively, they may be software processes running on the same server. Further one service provider may be connected to more than one SDP node and equally one mobile subscriber may be connected to more that one SDP node.

In this system an administrator person 103 responsible for the SDP nodes uses management interface of the SDP nodes 101 and 102 separately in order to control their operation.

In order to improve this situation solutions, wherein SDP nodes have been integrated into a common external management system, have been introduced. An example of such a system is SNMP (Simple Network Management Protocol) monitoring tools. Most of the node management can be done through such external system and the administrators can use mainly the external system. Nevertheless, some problem situations need to be solved by accessing the nodes directly via their own management interface.

An example of an implementation with such common external management system is shown in FIG. 2. The system is otherwise similar to the system of FIG. 1 but now the system comprises a management tool 200, which is connected to the SDP nodes 101 and 102 and which consolidates some of the management operations of the SDP nodes into one interface. Now the administrator person 103 may conduct some management operations, such as checking system status and clearing error conditions, via common management tool, but nevertheless, some other operations, such as viewing log information, changing configuration, starting, and stopping and restarting services, need to be done directly via management interface of the individual SDP nodes.

The problem with this solution is that the integration operation is expensive and that there are no guarantees of success. The solution may break down when a node is upgraded and adding new nodes may require redesigning of the whole system. Moreover, usually all management operations cannot be integrated and it may be impossible to integrate some components at any level. Still another problem is that node error situations may cause problems in the external management system.

Thereby there is a need to develop a new solution for management of SDP nodes.

SUMMARY OF THE INVENTION

An object of the present invention is to provide a new solution for management of service delivery platforms or some other comparable sets of network nodes.

One of the basic ideas of the invention is to provide a centralised management entity that supports a set of management interfaces (or at least one management interface). Information about the properties of the supported management interfaces is given to node application developers for example in the form of specifications and the nodes that are to be managed are then designed so that they implement one or more of these management interfaces as management components. Nodes may also implement only a limited set of management properties of one management interface instead of implementing them all. In this way various nodes can be managed via single management interface and nodes can be added to or deleted from the system without extensive redesigning.

That is, while in prior art the aim has been to adapt the management system to various nodes to be managed; now the limits of management operations are set in the management system side and the nodes to be managed are adapted to these limits.

According to a first aspect of the invention, there is provided a method for centralised management of a set of network nodes, the method comprising supporting, in a centralised management entity, operations of at least one predefined management interface, wherein said predefined management interface is specific to said centralised management entity, implementing, at least partially, at least one of said predefined management interfaces in the network nodes of said set, and controlling, via said centralised management entity, a network node of said set by means of a management interface implementation relating to said node.

According to a second aspect of the invention, there is provided a centralised management entity for a set of network nodes, the centralised management entity comprising processing means, which are adapted to control the centralised management entity to support operations of at least one predefined management interface, wherein said predefined management interface is specific to said centralised management entity, and to control a network node of said set via a management interface implementation relating to said node, said management interface implementation implementing at least one of the operations of said predefined management interface.

According to a third aspect of the invention, there is provided a network node for a set of centrally managed network nodes, the network node comprising processing means, which are adapted to control the network node to adapt for being managed via an at least partial implementation of a predefined management interface, wherein said predefined management interface is specific to a certain centralised management entity.

Such network node may be for example a SMS gateway, an MMS gateway, a WAP gateway, an HTTP gateway, an e-mail gateway, a subscription data profile manager, a content management system, a rendering engine, a personalisation engine, a direct delivery SMS center, a content transcoding engine, an OSA (Open Service Architecture) Parlay Gateway, a Parlay X Gateway, an IMS (IP Multimedia Subsystem) gateway node, a streaming server or some other gateway or node providing some other functionality in the mobile value added service delivery chain.

According to a fourth aspect of the invention, there is provided a system comprising a set of network nodes, the set comprising at least one network node, and a centralised management entity for said set of network nodes, wherein said centralised management comprises processing means, which are adapted to control the centralised management entity to support operations of at least one predefined management interface, wherein said predefined management interface is specific to said centralised management entity, nodes of said set comprise an at least partial implementation of at least one of said predefined management interfaces, and said processing means of said centralised management entity are further adapted to control a network node of said set via a management interface implementation relating to said node.

According to a fifth aspect of the invention, there is provided a computer program executable in a centralised management entity for a set of network nodes, the computer program controlling the centralised management entity to support operations of at least one predefined management interface, wherein said predefined management interface is specific to said centralised management entity, and to control a network node of said set via a management interface implementation relating to said node, said management interface implementation implementing at least one of the operations of said predefined management interface.

The invention further relates to such computer program stored on a memory device.

According to a sixth aspect of the invention, there is provided a computer program executable in a network node of a set of centrally managed network nodes, the computer program controlling the network node to adapt for being managed via an at least partial implementation of a predefined management interface, wherein said predefined management interface is specific to a certain centralised management entity.

The invention further relates to such computer program stored on a memory device.

According to an embodiment of the invention the system provides persistent storage for the system configuration and configuration upgrade and downgrade operations.

Dependent claims contain some embodiments of the invention. The subject matter contained in dependent claims relating to a particular aspect of the invention is also applicable to other aspects of the invention.

The invention suits well for providing an easier-to-use centralised management than in prior art without heavy integration project. In some embodiments of the invention management operations are nevertheless deeply integrated with managed nodes. Both reading and changing of configuration can be enabled. Further, statistics, logs, system load, other system information, and so forth can be used by means of embodiments of the invention.

The invention may facilitate management of SDP nodes or some other network nodes by means of providing common way to provide management data from nodes to the management system.

Further benefits of some embodiment of the invention include that

Single look and feel and usage models can be implemented for the management.

All management operations of various nodes can be incorporated into single management system.

Once a management interface is specified in the management system, it can be taken into use in every node.

Access control can be managed in a single place.

Some of the management operations can be automated with scripting or other administrator definable logic in the management system.

The centralised management system may implement multi-service provisioning operations with error checking. The system may ensure that the configuration changes are correct based on pre-defined rules.

Money can be saved by lower operating expenses and as redundancy needs to be set up only for the whole system, not separately for different node clusters.

In an embodiment of the invention the nodes may not even need to be aware of different access control policies, as access control can be handled already in the management system. In another embodiment of the invention service balancing is employed in the centralised management so that the system will be able to cope with bursty traffic.

BRIEF DESCRIPTION OF THE DRAWINGS

Embodiments of the invention will now be described by way of example with reference to the accompanying drawings in which.

DETAILED DESCRIPTION

In the following the term management system refers to a system, which is used for controlling a network node or a plurality of network nodes. The controlling may include for example changing all or part of the configuration or business logics running in a network node or accessing and monitoring system data of a network node.

Figure 1:
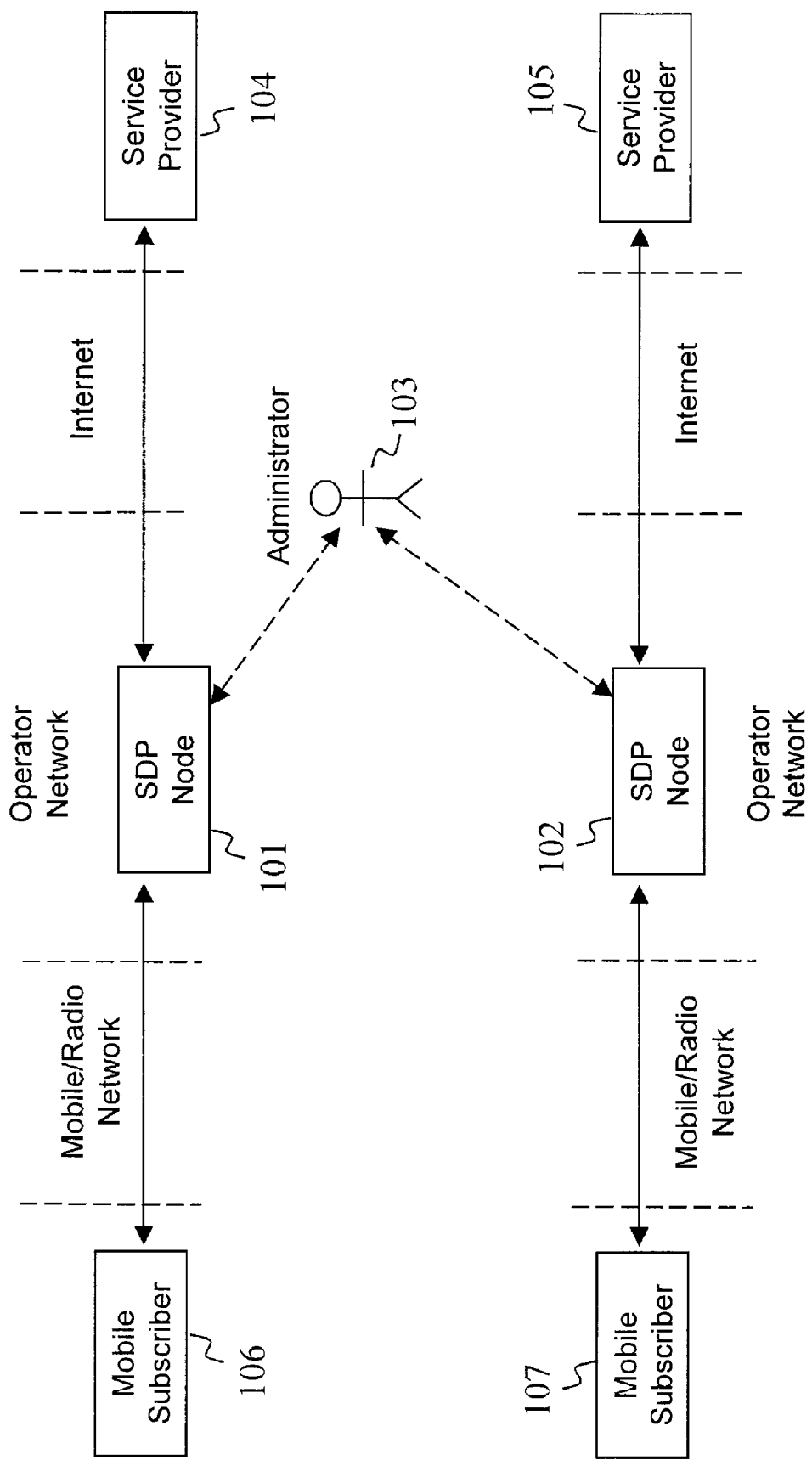
FIG. 1 shows a prior art system comprising service delivery platform nodes, which are managed individually.
Figure 2:
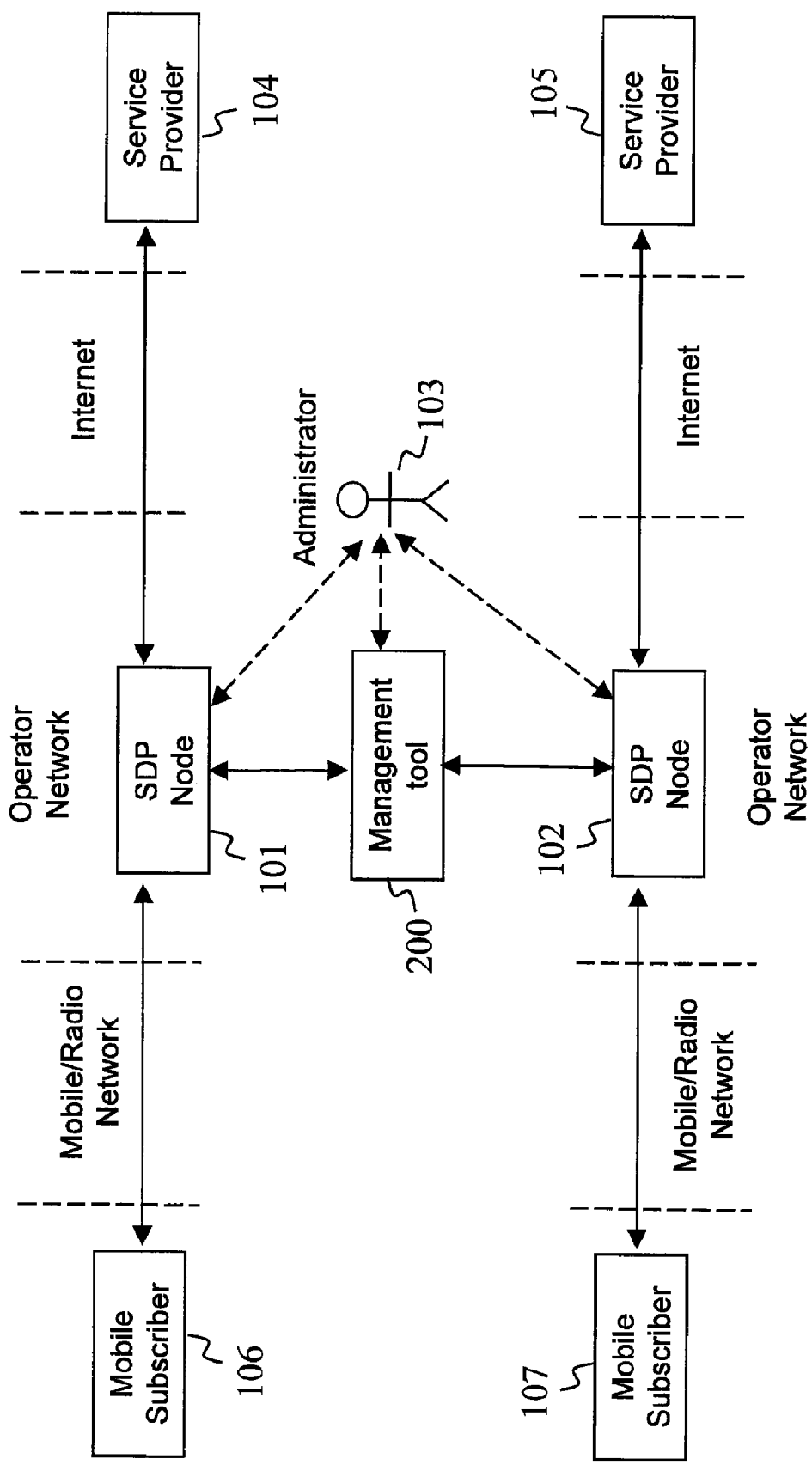
FIG. 2 shows a prior art system comprising service delivery platform nodes having an integrated management system.

FIGS. 1 and 2 were already discussed above in connection with prior art.

The management system and nodes according to the invention are implemented for example by means of software running on a suitable hardware platform (for example a general purpose computer or a server).

Figure 3:
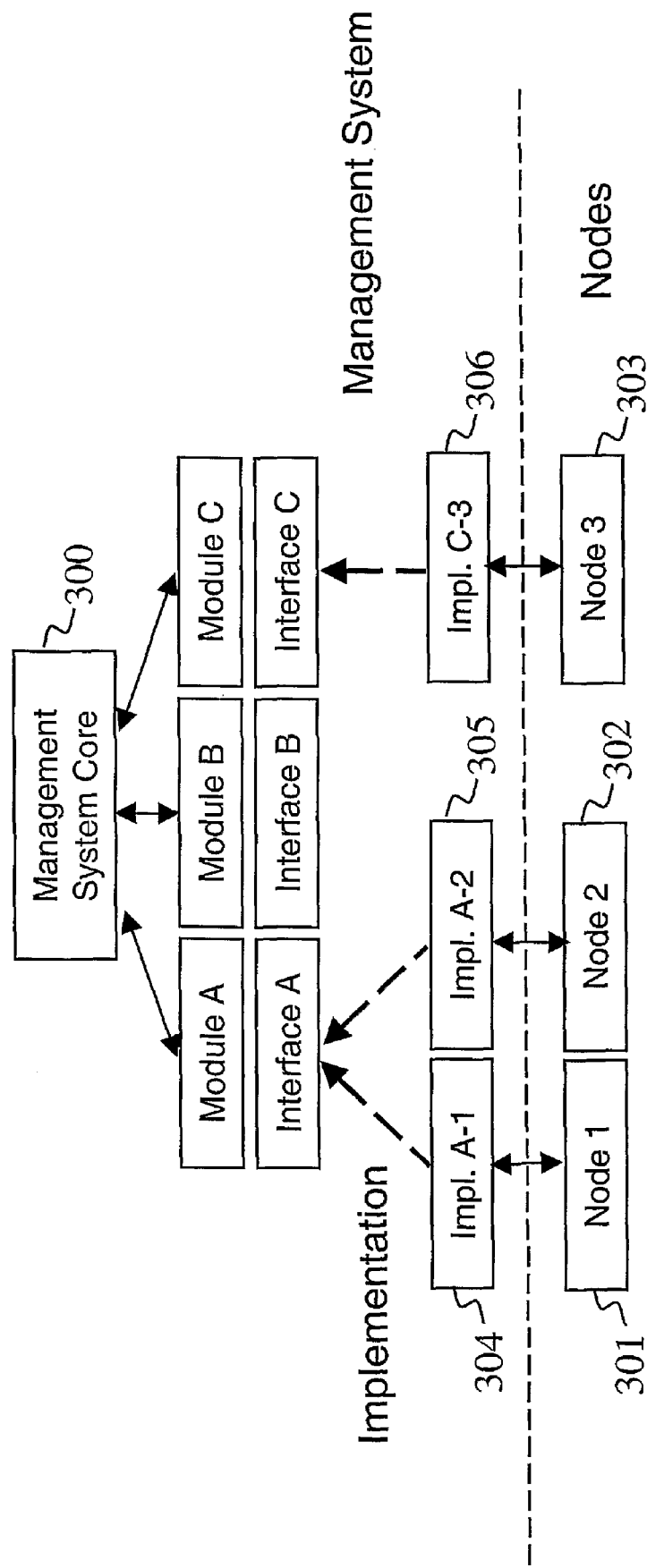
FIG. 3 illustrates the relationship between a management system and network nodes according to an embodiment of the invention.

FIG. 3 illustrates the relationship between a management system and network nodes in a software implementation according to an embodiment of the invention. The management system comprises a management system core and program code modules A, B and C. One of the modules may be for example a Java Servlet engine, while another one may be a PHP engine (PHP Hypertext Preprocessor). Each program code module has an associated management interface: interfaces A, B and C respectively. The program code modules together with the interfaces provide functionality of controlling various management operations relating to nodes.

A management interface may have support for example for one or several of the following functions:
configuration management,
log retrieval, search and manipulation,
monitoring,
statistics retrieval,
node controlling, for example startup and shutdown,
script and node logic management,
business logic provisioning, e.g. message routing rules,
access controlling, and
other management functionality.

The network nodes comprise program code for the network node functionalities 301-303 and separate program code forming management components 304-306. Each management component implements one of the interfaces associated with the program code modules of the management system: management components 305 and 306 implement interface A and management component 306 implements interface C. The management components of the network nodes are provided for the management system, which enables that the management system is used for controlling the network nodes.

Management components 304-306 comprise basically program code of the nodes 301-303, but this program code has been provided for use in the management system and connected into program code of the management system. Further, the program code of a management component is an implementation of an interface defined on the management system side. That is, as a default the management system includes facility to receive and take into use certain types of management components and in network nodes one or several of these management component types are implemented and then provided for use in the management system. A management component can be, for example, Java program or applet, JSP (Java Server Page) page, PHP (Hypertext Preprocessor) page, ASP (Active Server Page) page, HTML page, or Web Services Interface. The management component may be exposed (shown) directly to the administrator or it can be used by a modifiable logic, such as scripting, for automating administrative tasks. These tasks may include, for example, log rotating, periodical clean-ups, and data indexing.

There may be a data feed from a node to the management system for data gathering and another feed in the reverse direction for manipulating configuration and other settings of the node. Access to certain management functionality may be restricted with certain rules, such as administrator grouping or access right levels. This may be handled in the centralised management system or in an individual node. The access control can be bundled with the management interfaces, too, and the data feeds between the management system and nodes may contain also access control data.

The management system may be layered so that there is an access control layer in between which controls access to each configuration or data item. There may be a system that supports definition of roles (that is a set of access control options). The roles can be granted skills (sub-sets of access control options). The access control system may have an audit trail that lists all the configuration events carried out through the user interface.

Such an access control layer may be located for example between the management system core 300 and the program code modules A, B and C, or between the program code modules A, B and C and the interfaces A, B and C, or between the interfaces A, B and C and the management components 304-306 in the nodes.

Herein it must be noted that alternatively one management component may implement more than one interface of the management system or that one network node may comprise more than one management component. It is also possible that only part of or a description of the management component of a network node is provided for the management system. For example a management component stub may be provided for the management system. (A stub is a program code routine that doesn't actually do anything else than declares itself and the parameters it accepts. Stubs' substitute a longer program, possibly to be loaded later or that is located remotely. For example, a program that uses Remote Procedure Calls (RPC) is compiled with stubs that substitute for the program that provides a requested procedure. The stub accepts the request and then forwards it to the remote procedure. When that procedure has completed its service, it returns the results or other status to the stub, which passes it back to the program that made the request.)

In an embodiment of the invention the management system comprises an error check procedure relating to controlling of network nodes via the management system. The error check arrangement may be for example the following:

- The management components of network nodes further include rules, which can be used for identifying erroneous configuration with regard to that particular node.
- The management system then uses these rules for checking whether certain configuration is valid for a particular individual node and in addition to that checks whether the configuration of the individual node is valid in respect of the configuration of the whole system.
- If the management system identifies erroneous configuration attempts, it asks from the administrator person whether such configuration change should be really made.

Alternatively the error check arrangement may be partially or fully implemented in individual nodes. In that case the nodes check the control commands they receive before executing them. Clearly also some other error check arrangement is possible in the context of a management system according to the invention. Discussion of further details of such other error check arrangements is however dispensed with, since their use is in general known to a skilled person.

Figure 4:
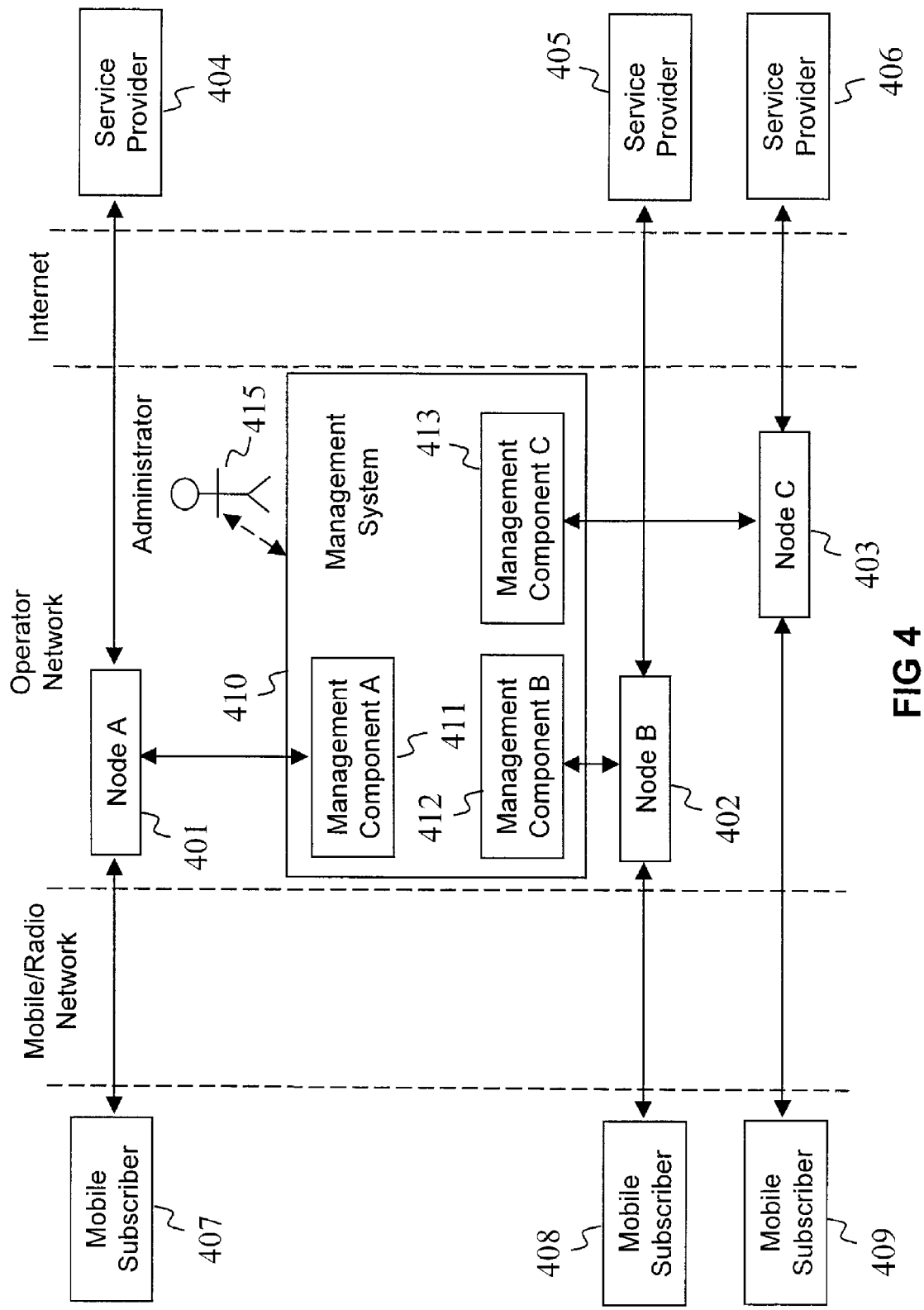
FIG. 4 shows a system according to an embodiment of the invention comprising centrally managed service delivery platform components.

FIG. 4 shows a system according to an embodiment of the invention comprising centrally managed service delivery platform components. The system comprises three SDP nodes 401-403 (node A, node B and node C) in an operator network. The SDP nodes may be for example an MMS gateway, a WAP gateway and an SMS gateway (or node providing some other messaging functionality). Service providers 404-406 are respectfully connected to the SDP nodes 401-403 over Internet. By means of the functionality provided by the SDP nodes these service providers provide services to mobile subscribers 407-409, which are respectively connected to the SDP nodes 401-403 via mobile network. Herein it must be noted that the SDP nodes need not be physically separate devices. Alternatively, they may be for example software processes running on the same server. Further one service provider may be connected to more than one SDP node and equally one mobile subscriber may be connected to more that one SDP node.

Further, the system comprises a management system entity 410, which is located in the operator network and which is connected to the SDP nodes 401-403. Control of management operations of the nodes 401-403 are consolidated into the management system entity 410 by means of management components 411-413 provided by respective SDP nodes 401-403. The management components implement one of the management interfaces defined for the management system. The management system entity 410 shows these interfaces to an administrator person 415 through its own user interface and provides required connectivity and navigation between different interfaces. The management system entity propagates configuration changes and commands given via the user interface of the management system entity to all required nodes. Thereby an administrator person 415 may conduct management operations of the SDP nodes 401-403 via the management system entity 410. Because the management operations are well defined from the management entity side, there is no need to access the SDP nodes directly (that is the administrator sees the combination of different SDP nodes as a single system). Also the look and feel of the management user interface may be changed in the management system.

Herein, the access control layer discussed above in connection with FIG. 3 would reside in between the management system entity 410 and the administrator person 415.

According to an embodiment of the invention the access control included in the management system implements 1) fine-grained access model, 2) role based access model, and/or 3) an audit trail. The management system may be arranged such that access to atomic configuration and data units can be configured. For configuration of nodes the access rights may be set read or write or not at all. For monitoring the nodes the access rights may be set to read or not at all. The management system may also support a role creation system. A role is a set of access rules assigned to one person. A full audit trail may be arranged for all activities conducted via the management system. The system may include cryptographic authentication for administrator persons and support for delegation of roles and access rights.

As an example a management system arrangement may include:

- A root role having full access rights to all data and configurations. Root is able to create new roles and grant roles to other users.
- An administrator role having extensive rights to access the system and right to create roles from the access right set in his/her authority.
- A monitoring user role having right to access a limited set of data and make some limited actions.

Root may be for example a security manager, who grants access rights to most of the tasks for a master administrator. The master administrator then delegates system subsets to administrators, who delegate monitoring rights to system monitoring personnel. Also some other access control arrangements may be used, but they are not further discussed herein, since their use is in general known to a skilled person.

Figure 5A:
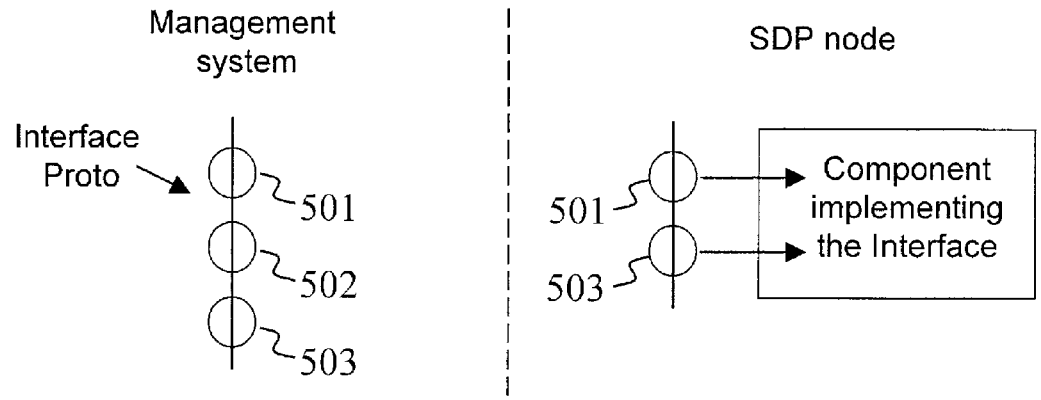
FIGS. 5A-5B show an implementation according to an embodiment of the invention, wherein both management system and network node comprise intelligence related to management of the network node.
Figure 5B:
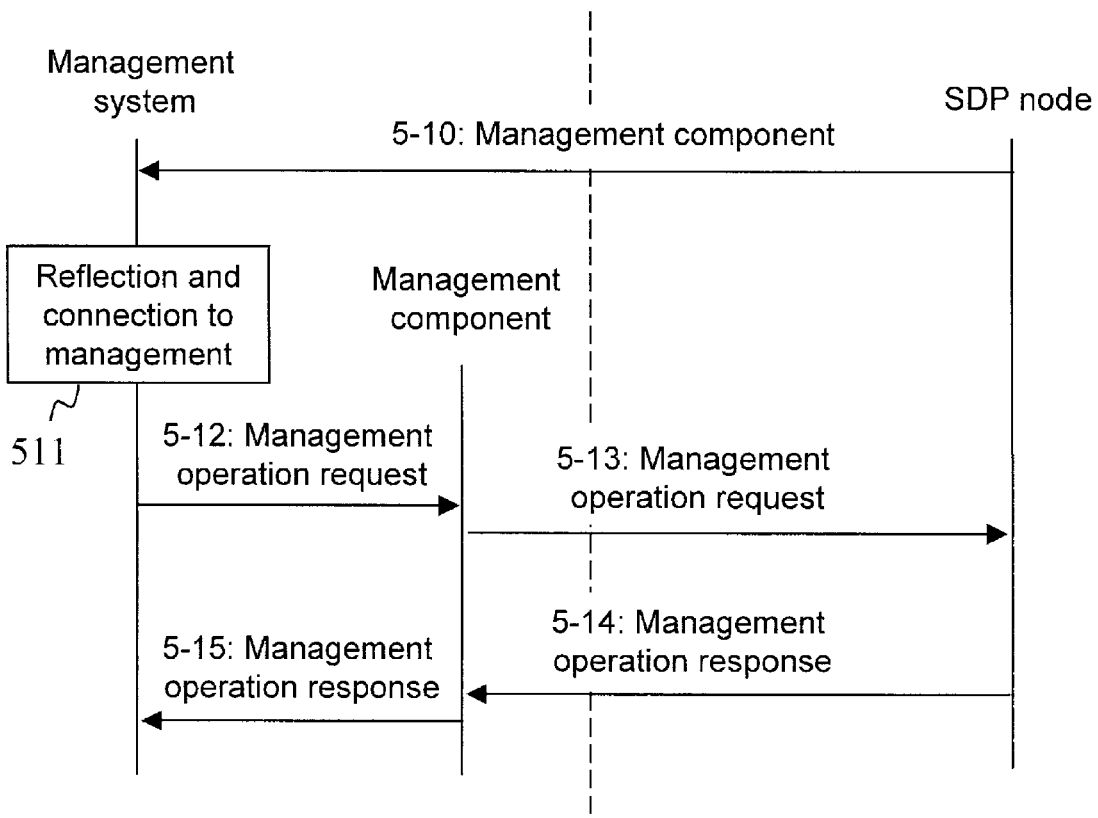

FIGS. 5A-5B show an implementation according to an embodiment of the invention, wherein both management system and network node comprise intelligence related to management of the network node.

FIG. 5A shows an interface prototype (a preliminary interface) that is defined on the management system side. The interface prototype comprises specifications of three management operations 501-503. That is, the management system comprises facilities to support these three management operations. Further, FIG. 5A shows a management component of an SDP node, which management component implements management operations 501 and 503 of the interface prototype.

The interface prototype on the management system side can be seen as a "virtual" interface in the sense that it defines all the operations that are possible but all of them may not ever be implemented in any actual interface.

FIG. 5B shows a messaging diagram illustrating the use of the management component shown in FIG. 5A. The starting point in the arrangement of FIG. 5B is that the manufacturer of the management system has informed the manufacturers of SDP nodes of the specification of the management interfaces supported in the management system (that is, the manufacturer of the management system has given the interface proto to the manufacturers of the SDP nodes). On the basis of these specifications the manufacturer of SDP nodes implements a management component in an SDP node.

When the SDP node is attached into an SDP system, the SDP node sends its management component 5-10 to the management system. (In principle the management component that is sent may be a management component stub, but the management system does not necessarily know this and therefore treats it the same way as a whole management component.) Alternatively, the management system may sniff the deployment to find new management components. Once the management component has been provided for the management system it is examined to discover its functionality on the basis of the predefined management interfaces (Reflection in Java) and connected to the management system in phase 511. (Reflection is a method in Java that enables Java code to discover information about the fields, methods and constructors of loaded classes, and to use reflected fields, methods, and constructors to operate on their underlying counterparts on objects.) Even though Java implementation is given herein as an example, the invention may clearly be implemented by without the use of Java.

Then, when a management operation related to the SDP node needs to be done, a management operation request 5-12, which is based on a command given via the user interface of the management system, is sent to the management component within the management system. The management operation request may be for example a command to be executed in the SDP node or an inquiry for statistics. The management component then formulates the request into a format understood by the SDP node and sends a management operation request 5-13 to the SDP node.

The SDP node conducts the requested operation and replies with a management operation response 5-14, which is sent to the management component. The management component interprets the response into a format understood by the managements system and forwards a management operation request 5-15 to the management system. That is, in this deployment both the management component residing in the management system and the SDP node include intelligence related to controlling operation of the SDP node. The management system itself does not need to be aware how exactly the management component and the SDP node talk to each other, since the management component takes care of converting data communicated between the management system and the SDP node.

Figure 6A:
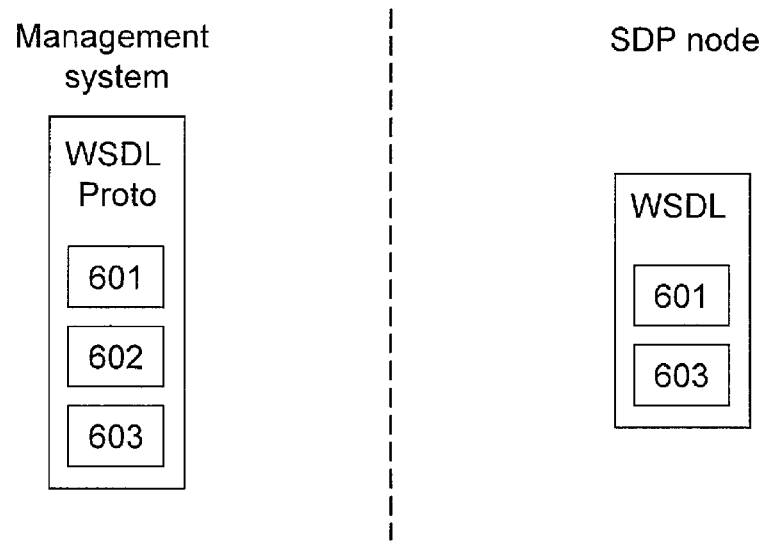
FIGS. 6A-6B show an implementation according to an embodiment of the invention, wherein the intelligence related to management of a network node is included in the network node.
Figure 6B:
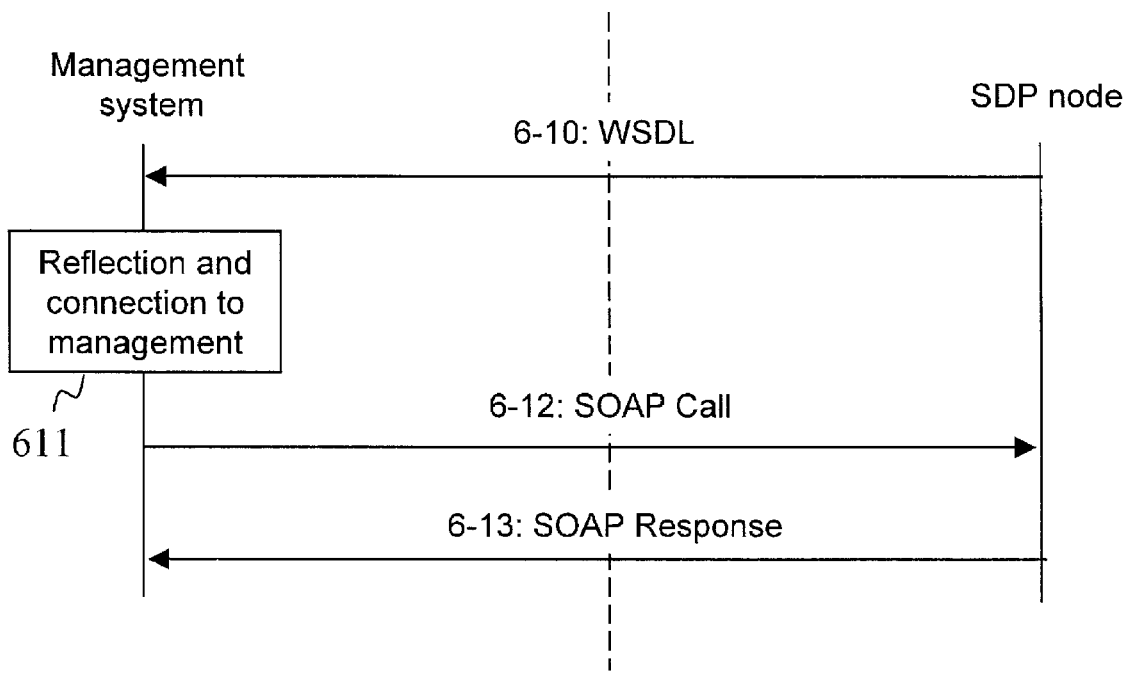

FIGS. 6A-6B show an implementation according to an embodiment of the invention, wherein the intelligence related to management of a network node is included in the network node.

FIG. 6A shows a WSDL (Web Service Description Language) prototype document (a preliminary WSDL document/interface) that is used to as the base for creating the actual interface description for the implemented interfaces and that is defined on the management system side. WSDL is an XML (Extensible Markup Language) format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

The WSDL prototype of the management system comprises description of three management operations 601-603.

Further, FIG. 6A shows a WSDL document of an SDP node, which WSDL document includes a description of management operations 601 and 603 of the WSDL prototype implemented as management components in the SDP node. That is the WSDL document of the SDP node gives a description of the management operations, which can be conducted in the SDP node.

FIG. 6B shows a messaging diagram illustrating the use of management operations in the arrangement shown in FIG. 6A. The starting point in the arrangement of FIG. 6B is that the manufacturer of the management system has informed the manufacturers of SDP nodes of the specification of the management interfaces supported in the management system (that is, the manufacturer of the management system has given the WSDL prototype to the manufacturers of the SDP nodes). On the basis of these specifications the manufacturer of SDP nodes implements into an SDP node a management component and defines a WSDL document describing the management operations of the management component. The WSDL document is a subset of the WSDL prototype, describing only the implemented functionality. (Depending on the implementation, herein the management operations may be an integral part of the SDP node instead of a separate management component.)

When the SDP node is attached into an SDP system, the SDP node sends its WSDL document 6-10 to the management system. Alternatively, the management system may sniff the deployment to find new WSDL documents and related management components. Once the WSDL document has been provided for the management system it is examined to discover its functionality on the basis of the implemented management interfaces and connected to the management system in phase 611.

Communication between the management system and the SDP node is conducted by means of SOAP (Simple Object Access Protocol). SOAP is a lightweight protocol for exchange of information in a decentralized, distributed environment. It is an XML based protocol that consists of three parts: an envelope that defines a framework for describing what is in a message and how to process it, a set of encoding rules for expressing instances of application-defined data types, and a convention for representing remote procedure calls and responses. SOAP can potentially be used in combination with a variety of other protocols.

When a management operation related to the SDP node needs to be done, a SOAP Call 6-12, which is based on a command given via the user interface of the management system, is sent to the SDP node. The SOAP Call 6-12 may include for example a command to be executed in the SDP node or an inquiry for statistics. The SDP node then conducts the required operation and replies with a SOAP response 6-13. That is, in this deployment all the intelligence related to the management operations conducted in the SDP node resides in the SDP node and the management system has just a description of what can be done in the SDP node (the management component is simply registered in the management system).

In relation to FIGS. 5A-5B and 6A-6B it must be noted that all management operations do not require a response from the SDP node. That is, some management operations may be push-type commands, for which no response is expected from the SDP node. Furthermore, communication between a single management component and related node is freely definable. Especially in the case of FIGS. 5A and 5B, the management system does not need to know which protocol is used between a management component and related node. The communication between the nodes and their management components may be synchronous or asynchronous and any protocol, such as HTTP, SOAP, RMI, CORBA, and so forth, may be used. Further, the communication may be encoded in any format, such as XML, plain text, binary messages, and so forth. The interface communication may be based on some previously known management protocol, too. Usually the protocols that are used are system dependent.

In addition to the options described in connection with FIGS. 5 and 6, the management interface of the invention may be effected by means of a predefined management protocol. In such configuration the centralised management supports the management protocol and the network nodes implement that are managed at least some aspects of the management protocol.

In an embodiment of the invention the management interface descriptions (prototypes) of the management system are versioned. The management system supports all versions of the interfaces so that nodes supporting different versions of management interfaces can be employed in the same system. Thereby, better compatibility for heterogeneous deployments is provided.

Figure 7:
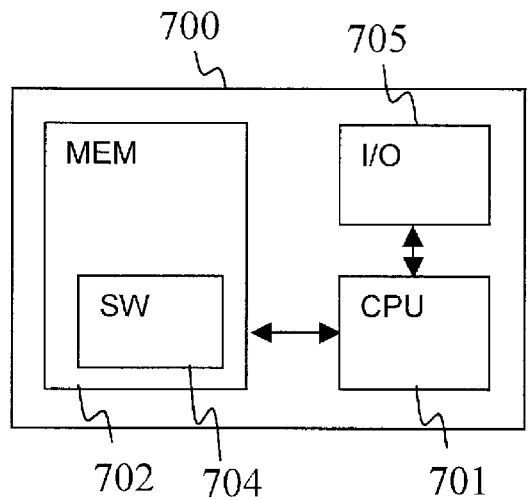
FIG. 7 shows a simplified block diagram of a centralised management entity according to an embodiment of the invention.

FIG. 7 shows a simplified block diagram of a centralised management entity according to an embodiment of the invention. The centralised management entity may be for example a general-purpose computer or a server.

The centralised management entity 700 comprises a processing unit 701 and a memory 702 coupled to the processing unit 701. The memory comprises software 704 executable in the processing unit 701. The processing unit is further connected to an input/output unit 705, via which the centralised management entity communicates with other devices and via which the centralised management entity communicates with a set of network node to be managed. The input/output unit 705 comprises also user interface (not shown) by means of which the centralised management entity is used. The user interface may comprise for example a display and keyboard.

The processing unit 701 controls, in accordance with the software 704, the centralised management entity to support operations of at least one predefined management interface, wherein the predefined management interface is specific to the centralised management entity, and to control a network node of the set of network nodes by means of a management interface implementation (not shown) of that node, wherein the management interface implementation of the node implements at least one of the operations of the predefined management interfaces of the centralised management entity. The management interface implementation of the network node may reside partially or fully in the memory 702 of the centralised management entity.

Figure 8:
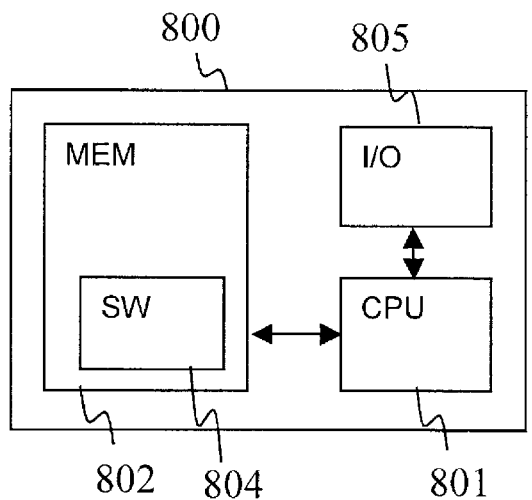
FIG. 8 shows a simplified block diagram of a network node according to an embodiment of the invention.

FIG. 8 shows a simplified block diagram of a network node according to an embodiment of the invention. The network node may be for example a general-purpose computer or a server.

The network node 800 comprises a processing unit 801 and a memory 802 coupled to the processing unit 801. The memory comprises software 804 executable in the processing unit 801. The processing unit is further connected to an input/output unit 805, via which the network node communicates with other devices and via which the network node communicates with a centralised management entity.

The processing unit 801 controls, in accordance with the software 804, the network node to adapt for management via an implementation of a management interface, which is specific the centralised management entity with which the network node communicates. Further the processing unit may control the network node to provide at least partial implementation of the predefined management interface to the centralised management system.

In an embodiment of the invention the centralised management entity manages also node processes. The management system has one or more small applications running in the nodes (in the same hardware as the node software). These small applications may for example monitor the operations in the node hardware (for example load variations, error situations and physical problems in the node), control the processes (other applications) in the node and stop and start services (other applications) in the nodes.

By means of these small applications dynamic load/service balancing is enabled within an SDP deployment, especially in SDP clusters comprising more than one parallel hardware entity for each service type. The SDP cluster may be set up for example by means of blade servers. (Blade server is a thin, modular electronic 5 circuit board, containing one, two, or more microprocessors and memory, that is intended for a single, dedicated application (such as serving Web pages) and that can be easily inserted into a space-saving rack with many similar servers.) For example, if MMS traffic increases, some SMS gateways in the cluster may be switched to MMS gateways to handle the load.

The logic that is used for balancing the services may be chosen freely within the scope of this embodiment. The information, on the basis of which balancing decisions are made, may come from the small applications running in the nodes or from an external system that monitors some external parameters, such as volume of different traffic types, that is, for example the number of SMS and MMS messages. Also the administrator person may start the balancing process or the information on which the load balancing decision is based may come from a suitable external entity.

Figure 9:
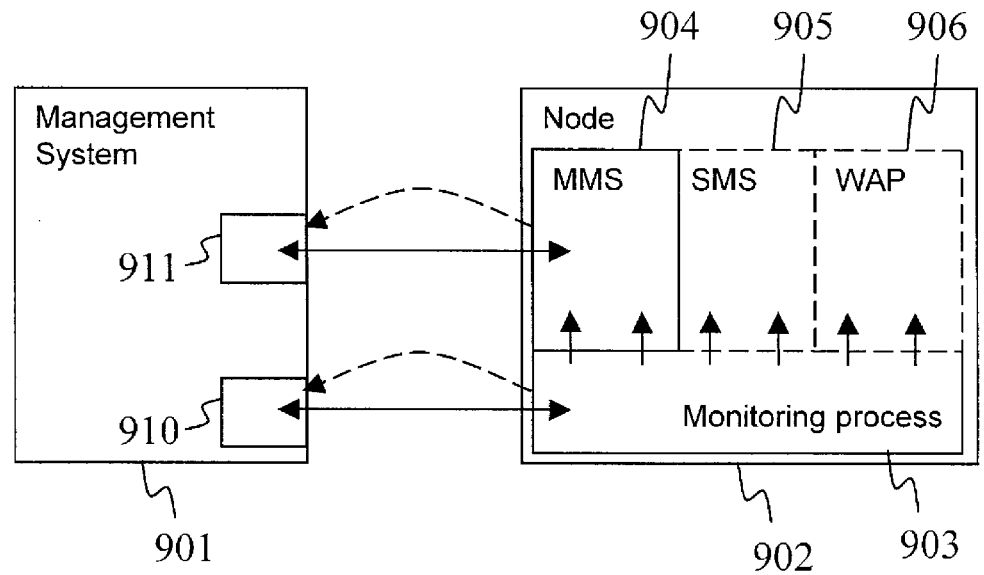
FIG. 9 shows a simplified block diagram of a load balancing arrangement according to an embodiment of the invention.

FIG. 9 shows a simplified block diagram of a load balancing arrangement according to an embodiment of the invention.

The arrangement comprises a management system entity 901 and a managed node 902. In the managed node there is running a monitoring process 903, which monitors and controls services running in the node 902. The node comprises facilities (appropriate software) for MMS service 904, SMS service 905 and WAP service 906. The monitoring process 903 may start and stop any of these services, such that typically only one of the services is running in the node at a time. The monitoring process 903 has provided a management component 910 to the management system (dashed arrow between the monitoring process and the management system illustrates this) so that the operations of the monitoring process can be controlled (solid arrow between the monitoring process and the management component 910 illustrates the controlling) via the management system.

Let's now consider that initially none of the services 904-906 is running in the node. Once a service needs to be set up in the node, a corresponding start up command is given to the monitoring process 903 via the management system 901 and the management component 910 of the monitoring process residing in the management system. The command that is given may be for example to start up the MMS service 904. As a response to this the MMS service initialises, provides its management component 911 to the management system (dashed arrow between the MMS service process 904 and the management system illustrates this) and begins to provide the MMS service. Alternatively the monitoring process 903 may inform the management system 901 of successful start up of the MMS service, whereby the management system may sniff for the management component of the MMS service. Thereafter the MMS service process 904 can be normally managed via the management system and the management component 911 (solid arrow between the MMS service process 904 and the management component 911 illustrates this).

Naturally the management system 901' may manage plurality of such nodes comprising a monitoring process and facilities for various services.

Then, if for some reason (for example because of load variations) the MMS service 904 in the node 902 needs to be shut down and replaced by SMS service, the arrangement of FIG. 9 operates as follows:

A command to shut down the MMS service 904 and to start up the SMS service 905 is given to the monitoring process 903 via the management system and the management component 910.

The monitoring process shuts down the MMS service gracefully, whereby the MMS service stops.

The monitoring process starts up the SMS service.

The SMS service initialises, optionally provides its management component to the management system, and begins to provide the SMS service.

After completing the task of shutting down and starting up services the monitoring process informs this to the management system.

By means of the load balancing embodiment described above the overall system can be easily adapted to varying use of resources and thereby to cope with bursty traffic. Also expenses can be reduced, since redundancy needs to be provided only for the whole system, not for different node clusters as one node can be easily moved from one cluster to another.

Particular implementations and embodiments of the invention have been described above. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method for centralised management of a set of network nodes, the set comprising a plurality of network nodes, wherein the method comprises supporting, in a centralised management entity, management operations of at least one predefined management interface, wherein said predefined management interface is specific to said centralised management entity, receiving, from at least one network node of said set, a management component said management component implementing a management operation of at least one of said predefined management interfaces, examining the management component to discover management operations implemented in the management component, and in said centralised management entity, using management operations implemented in a management component relating to a said at least one network node as an intermediate in controlling said network node.

2. A method according to claim 1, wherein said receiving is conducted by means of that the centralised management entity searches for management components of network nodes or information about management components of network nodes.

3. A method according to claim 1, wherein said controlling is at least partially automated by means of scripts or predefined logic.

4. A method according to claim 1, wherein said centralised management entity comprises an access control functionality, and the method comprises using said access control functionality for controlling access to a management component relating to certain node.

5. A method according to claim 1, wherein said method further comprises controlling, via said centralised management entity, a monitoring process residing in a network node of said set by means of a management component relating to said monitoring process.

6. A method according to claim 5, wherein said method further comprises balancing load in said set of network nodes by means of controlling services running in said nodes via said monitoring process.

7. A method according to claim 6, further comprising conducting said load balancing by commanding said monitoring process to shut down and start up services in said nodes.

8. A method according to claims 5, further comprising conducting said load balancing responsive to monitoring information from the monitoring process.

9. A method according to claim 1, further comprising taking, via the centralised management system, a snapshot of a system configuration of a network node.

10. A method according to claim 9, further comprising restoring, via the centralised management system, a previously taken snapshot of a system configuration of a network node.

11. A method according to claim 1, wherein said controlling of a network node comprises at least one of the following: changing all or part of the configuration or business logics running in the network node, and accessing and monitoring system data of the network node.

12. A method according to claim 1, further comprising conducting, in the centralised management system, an error check procedure relating to said controlling of a network node.

13. A centralised management entity for a set of network nodes, the set comprising a plurality of network nodes, wherein said centralised management entity comprises processing means, which are adapted:

to support management operations of at least one predefined management interface, wherein said predefined management interface is specific to said centralised management entity, to receive, from at least one network node of said set, at least part of a management component, said management component implementing a management operation of at least one of said predefined management interfaces, to examine the management component to discover management operations implemented in the management component, and to control a network node of said set via management operations implemented in said management component relating to said node.

14. A network node for a centrally managed set of network nodes, wherein said network node comprises a management component implementing at least one management operation of a predefined management interface, which is specific to a certain centralized management entity, and processing means, which are adapted to send to the centralised management entity at least part of the management component, wherein the network node is adapted -to be managed via management operations implemented in said management component.

15. A network node according to claim 14, wherein the processing means are further adapted to send information about the management component to the centralised management system.

16. A network node according to claim 14, wherein the network node is one of the following: a SMS gateway, an MMS gateway, a WAP gateway, an HTTP gateway, an e-mail gateway, a subscription data profile manager, a content management system, a rendering engine, a personalisation engine, a direct delivery SMS center, a content transcoding engine, an OSA (Open Service Architecture) Parlay Gateway, a Parlay X Gateway, an IMS (IP Multimedia Subsystem) gateway node, a streaming server or some other gateway or node providing some other functionality in the mobile value added service delivery chain.

17. A memory medium embodying a computer program executable in a centralised management entity for a set of network nodes, wherein said computer program controls the centralised management entity
- to support management operations of at least one predefined management interface, wherein said predefined management interface is specific to said centralised management entity,
- to receive, from at least one network node of said set, a management component, said management component implementing at least one management operation of said predefined management interface,
- to examine the management component or the information about the management component to discover management operations implemented in the management component, and to use a management operation implemented in said management component as an intermediate in controlling said at least one network node.

18. A memory medium embodying a computer program executable in a network node of a set of centrally managed network nodes, wherein network node comprises a management component implementing at least one management operation of a predefined management interface, which predefined management interface is specific to a certain centralised management entity, and wherein said computer program controls the network node to send to the centralised management entity at least part of the management component, and to adapt for being managed via management operations implemented in said management component.

19. A centralised management entity according to claim 13, wherein the processing means are further adapted to control the centralised management entity to effect said receiving by searching for management components of network nodes or information about management components of network nodes.

20. A centralised management entity according to claim 13, wherein the processing means are further adapted to control the centralised management entity to control a monitoring process residing in a network node of said set by means of a management interface implementation relating to said monitoring process.

21. A centralised management entity according to claim 20, wherein the processing means are further adapted to control the centralised management entity to balance load in said set of network nodes by means of controlling services running in said nodes via said monitoring process.

22. A centralised management entity according to claim 13, wherein said controlling of a network node comprises at least one of the following: changing all or part of the configuration or business logics running in the network node, and accessing and monitoring system data of the network node.

23. A network node according to claim 14, wherein the processing means are further adapted to control the network node to run a monitoring process, and wherein
said management component is adapted to be used for controlling said monitoring process.

24. A method according to claim 1, wherein said management component is a piece of program code, which is executed in the centralised management entity.

25. A method according to claim 1, wherein a management component relating to a certain network node comprises program code for converting data communicated between said centralised management entity and said certain network nodes from format understood by said centralised management entity into format understood by said certain network node and vice versa.

26. A method for centralised management of a set of network nodes, the set comprising a plurality of network nodes, wherein the method comprises supporting, in a centralised management entity, management operations of at least one predefined management interface, wherein said predefined management interface is specific to said centralised management entity, receiving, from at least one network node of said set, information about a management component, said management component implementing in said at least one network node of said set a management operation of at least one of said predefined management interfaces, examining the information about the management component to discover management operations implemented in the management component, and
in said centralised management entity, using management operations implemented in a management component relating to a said at least one network node as an intermediate in controlling said network node.

* * * * *